United States Patent [19]

Seymour

[11] 3,938,274

[45] Feb. 17, 1976

[54] OCEANIC FISHING SYSTEM
[75] Inventor: David J. Seymour, Daly City, Calif.
[73] Assignee: Anthony M. Ursich, Del Mar, Calif.
[22] Filed: Mar. 3, 1975
[21] Appl. No.: 554,445

[52] U.S. Cl. ................................. 43/4.5; 114/125
[51] Int. Cl.² ........................................ A01K 73/12
[58] Field of Search ........................ 43/4.5; 114/125

[56] References Cited
UNITED STATES PATENTS

| | | | |
|---|---|---|---|
| 1,888,667 | 11/1932 | Hort .................. | 114/125 |
| 1,980,,452 | 11/1934 | Tice et al .............. | 43/4.5 |
| 2,024,822 | 12/1935 | Hort .................. | 114/125 |
| 2,673,415 | 3/1954 | Strom ................. | 43/4.5 |
| 3,192,888 | 7/1965 | Field ................. | 114/125 |
| 3,314,184 | 4/1967 | Lerch ................. | 43/4.5 |
| 3,793,760 | 2/1974 | Puretic ............... | 43/4.5 |

Primary Examiner—Robert Peshock
Assistant Examiner—Daniel J. Leach
Attorney, Agent, or Firm—Owen, Wickersham & Erickson

[57] ABSTRACT

A purse-seine net, lures, or other fish catching devices are used in conjunction with a fishing vessel having a normally closed opening through the side of its hull below waterline. When the purse-seine net is used, a looped opening at the end of the net is placed over and around the opening through the vessel's hull, and the fish are transferred from the net in through the hull, as by suction, into a hold area where they are separated from the sea water; then the sea water is returned to the sea. Trim and stability problems of the vessel are solved by a novel system incorporating one or more compensating tanks, a ballast pump, and novel hull design.

6 Claims, 15 Drawing Figures

FIG_1
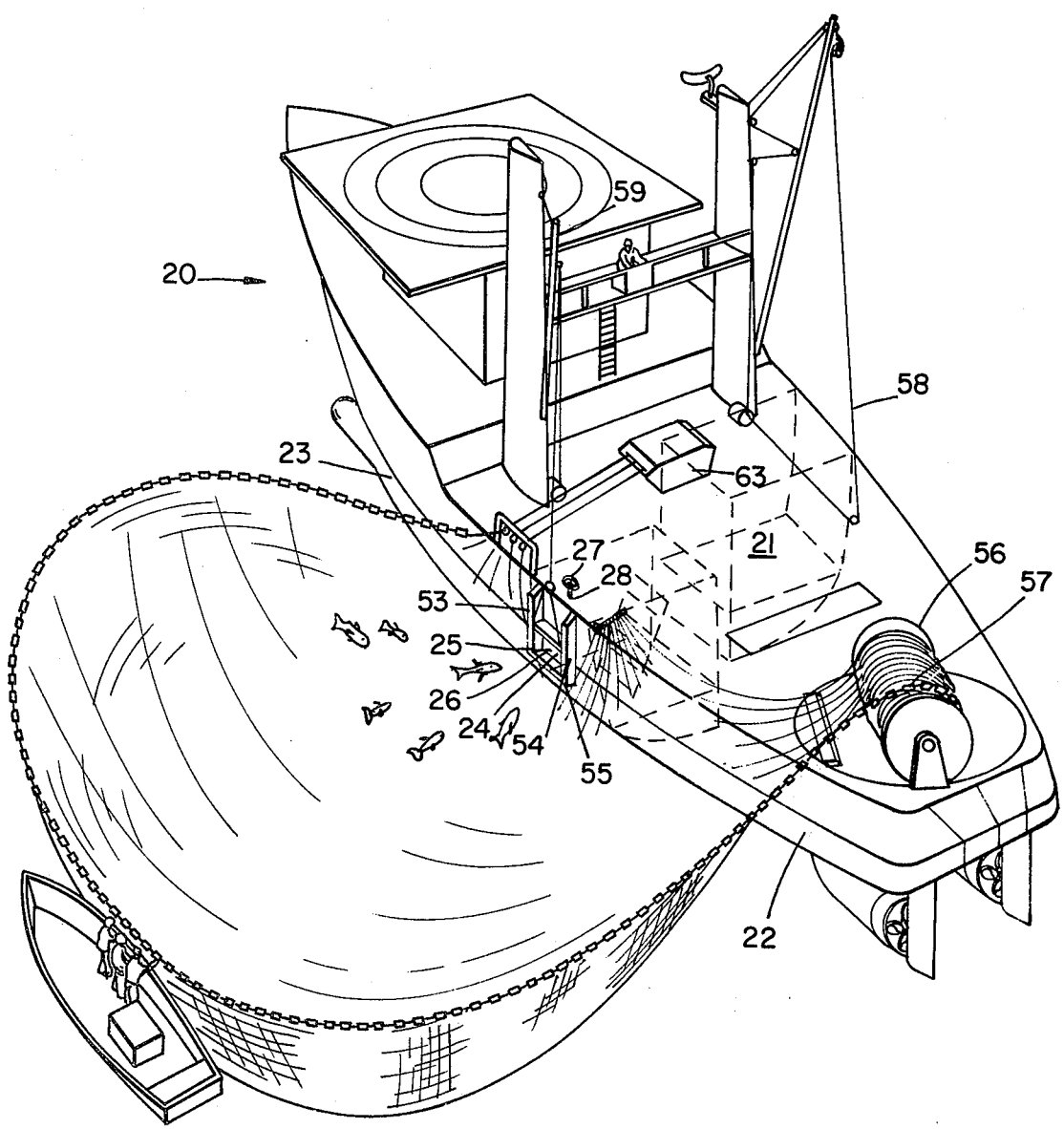

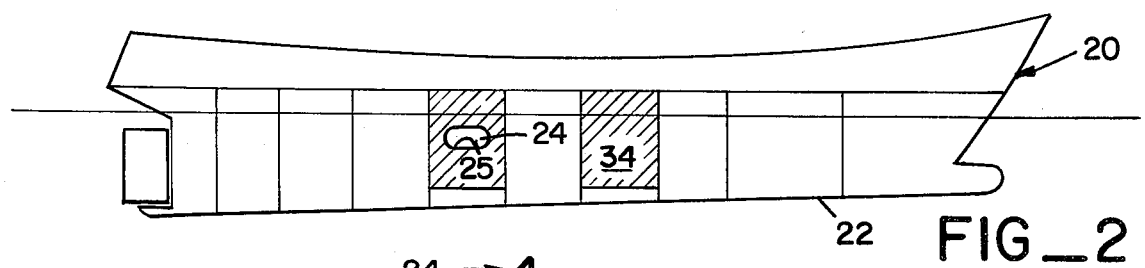
FIG_2
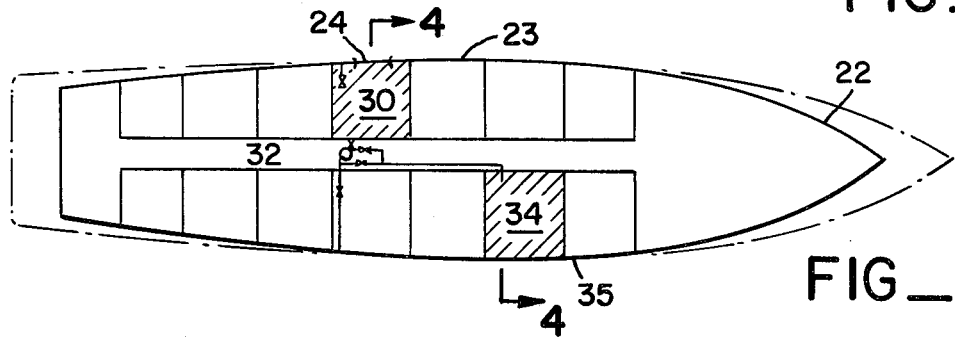
FIG_3
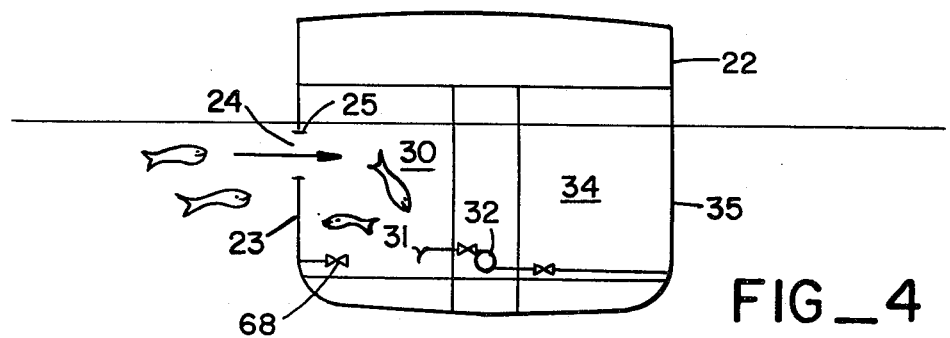
FIG_4
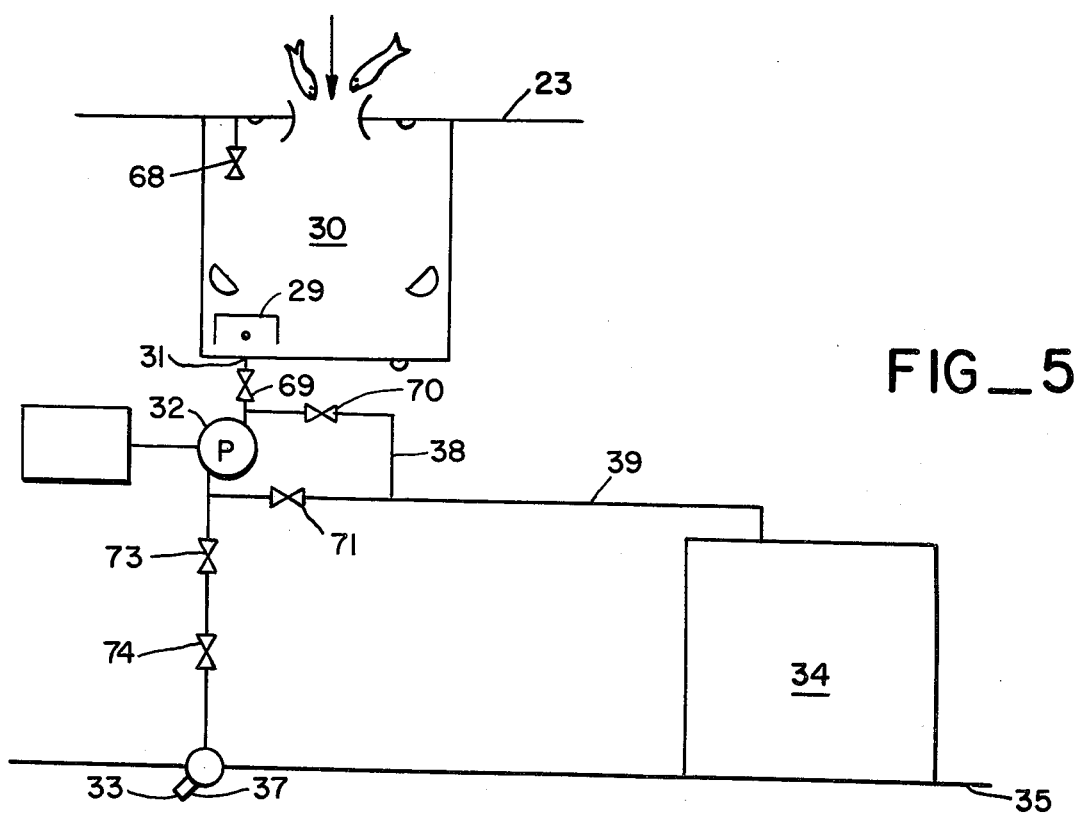
FIG_5

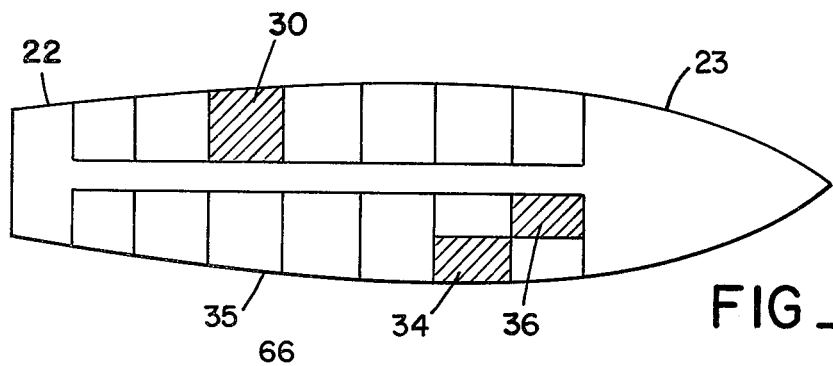
FIG_6
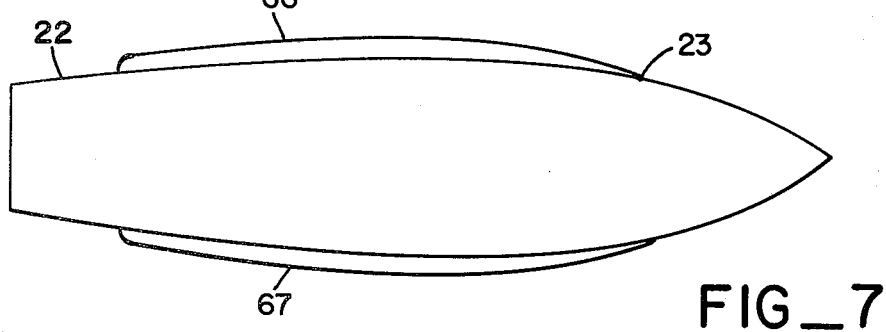
FIG_7
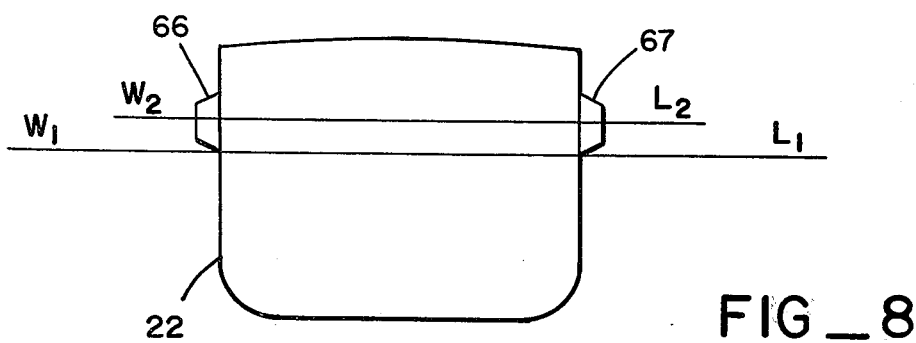
FIG_8
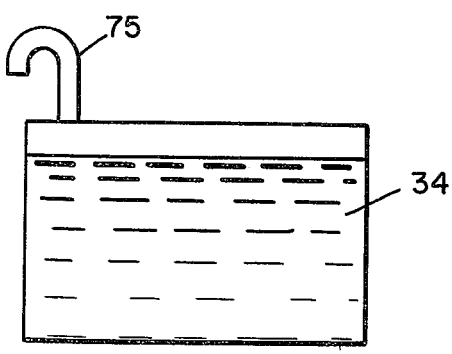
(PRIOR ART)
FIG_9
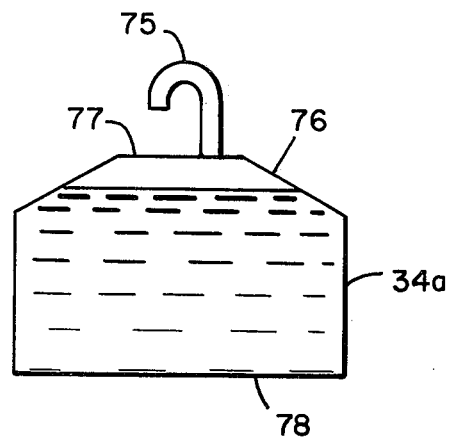
FIG_10

OCEANIC FISHING SYSTEM

BACKGROUND OF THE INVENTION

This invention relates to oceanic fishing and has both apparatus and method aspects.

The invention has particular pertinence to the fishing of tuna and similar large fish found in quantity in some ocean waters. It has long been the practice to employ purse-seine nets, setting the net around an approximately circular area, then drawing and pursing the net to reduce the area of the bottom opening, thereby creating a pocket or purse with the net to entrap the fish while drawing the net aboard ship, then shortening the net to reduce the purse size, concentrating the fish in an ever smaller area and volume. From this point, various methods have been used to transfer the fish into the ship, such as brailing, suction pumping, and shoveling the fish into containers which are lifted onto the deck. The pursed net cannot be lifted, due to the weight of the fish, in some cases amounting to one hundred tons. All the methods heretofore in use have been awkward, laborious, time-consuming, and inefficient. They have called for considerable hand labor and for operation on relatively small quantities of fish reducing the availability of the ship and net to undertake further catches of fish in the area.

SUMMARY OF THE INVENTION

In the present invention the efficiency of the operation is greatly improved by a system provided with an opening in the ship's hull below the waterline. Of course, means is provided for normally effecting a watertight closure of this opening, but when the opening has been opened, then sea water can easily flow into the adjacent hold or tank within the vessel. Suction means is provided for pumping water out of the hold, thereby drawing in water by suction through the opening and drawing in fish adjacent to the hole into the vessel with the water. This system can be used not only with a purse-seine net but with any form of luring system.

When a purse-seine net is used in this invention, the net is brought around the opening through the ship's hull in such a manner that the fish have only one exit and so that as the net is tightened and shortened, the fish are gently urged toward the opening. The final contents of the net are also harvested in the same manner.

When other luring systems are used, the fish are in some manner attracted to the seawater near the opening through the ship's hull and then flowed in through it, as by suction, into the hold.

Moreover, the fish are separated from the sea water inside the hold or fish entry tank. The separation can be done mechanically, as by a suitable bucket-type conveyor or elevator in conjunction with a screen, funneling the fish onto the conveyor to prevent them from escaping out the hole or from being pumped out from the hold and back to the ocean. Further mechanization is provided to speed-up the operation, so that it becomes quite rapid, as compared with present-day practice. As a result, the ship and its net are soon available to be utilized in making another catch, instead of being occupied for many, many hours, as during a brailing operation.

PROBLEMS RELATED TO PRACTICING THE INVENTION

The provision of a large opening in the vessel's side has major effects on the trim and stability characteristics of the vessel. These effects combine to reduce the vessel's reserve buoyancy, her transverse and longitudinal metacentric heights and also introduces large heeling and trimming moments.

The flooding of a relatively large compartment in a vessel on one side causes the following:
 a. large heel or list,
 b. trim, which is minor if the hole is near amidships,
 c. sinkage, due to loss of buoyancy,
 d. loss of $GM_T$ (metacentric height) due to loss of waterplane area, and
 e. reduction of freeboard on low side (this loss may cause the deck edge to submerge, with possible capsizing as a result).

The present SOLAS 1960 (Safety of Life at Sea Convention) Rules for passenger ships are strict for vessels having longitudinal watertight bulkheads where side damage would flood a compartment on one side (as in this case), and they require that the vessel be fitted with transverse equalizing ducts to enable rapid flooding of opposite side compartments, to prevent the vessel from capsizing. This basic rule was originally instituted by SOLAS Rules after the sinking of the S. S. EMPRESS OF IRELAND in the St. Lawrence River in 1914. She was holed in the side by a freighter, with subsequent flooding of her side coal bunkers. Longitudinal coal bunker bulkheads prevented the flow of water across to the opposite side, resulting in her rolling over while doing 19 knots in the icy waters of the St. Lawrence, drowning 1012 persons.

SOLUTION OF THE TRIM AND STABILITY PROBLEMS:

Summary of Further Features of the Invention

In order to compensate for these effects and to maintain stability and seaworthiness, the present invention employs a specially designed hull form with special subdivision and stability characteristics, together with adequate pumping and piping controls for rapid transfer of sea water. It may be noted that many vessels, particularly naval and fishing, have been designed to provide flooding of after-compartments; however, these prior-art designs have had only a minor effect on the transverse stability and intact buoyancy of the vessel, as compared to the large transverse heeling moments provided by the present invention.

To overcome the trim and stability problems mentioned above while providing for underwater fish entry into the vessel's fish entry tank, a special, unique tank-compensating system, together with an improved hull form for stability, is provided by the present invention. The compensating tank or tanks is or are of the size and location to provide equalizing heel and trimming moments to offset the effects of flooding of the tank.

The compensating tank system is filled by a large capacity water transfer pump, which takes suction from the fish entry tank at a rate equal to its flooding. Upon filling of the compensating tank system, the pump discharge is then directed overboard at a rate to provide a velocity of suction flow through the hull opening into the fish entry tank of about five knots.

To empty the fish entry tank, after the side door or gate is closed, the pump takes suction simultaneously from both a compensating tank and fish entry tank, thus offsetting effects of trim and list during this operation. A low-head high volume pump is used.

Other objects and advantages of the invention will appear from the following description of a preferred form thereof.

BRIEF DESCRIPTION OF THE DRAWINGS

In the drawings:

FIG. 1 is a view in perspective of apparatus embodying the principles of the present invention being used in a fishing operation. A purse-seine net has been set, drawn, and pursed, the looped opening at the end of the net has been put in place in line with an opening through the side of the hull below waterline, and fish are sucked toward that opening.

FIG. 2 is a view in side elevation of the hull of a typical fishing vessel of the present invention, omitting the superstructure.

FIG. 3 is a diagrammatic plan view of the hull showing hold compartments and the water-flow system.

FIG. 4 is a diagrammatic view in section taken along the line 4—4 in FIG. 3.

FIG. 5 is a partly diagrammatic plan view of a fish entry tank embodying the principles of the invention, equipped with fish lures and a water valving system.

FIG. 6 is a view similar to FIG. 3 showing an alternate arrangement of compensating tanks suitable for use in this invention.

FIG. 7 is a diagrammatic plan view of a hull with side shell blisters for improving the transverse stability of the vessel when the fish entry tank and the compensating tank or tanks are full.

FIG. 8 is a view in section taken along the line 8-8 in FIG. 7 and showing the relation to the waterlines in the full load state and the operating mode.

FIG. 9 is a view in section of a conventional tank illustrating prior art.

FIG. 10 is a similar view of a compensating tank shaped to reduce free surface area of the water in the tank when the tank is full.

As shown in FIGS. 1 through 3, the invention incorporates a ship 20 having a deck 21 and a hull 22 with a side portion 23, preferably on the port side. Through this side portion 23 is an opening 24 that leads into a large duct 25. The opening 24 and duct 25 are so shaped and of such a size as to accommodate the physical entry of large fish, regardless of their orientation. A watertight gate 26 (FIG. 1) external to the hull 22 or side shell 23, is provided for shutting off the duct 25 closely adjacent the opening 24, making the ship substantially watertight at that area. This closure gate 26 may be operated manually with the aid of a handle 27 and a screw 28, or it may be operated hydraulically, electrically, or in some other suitable mechanical manner to provide watertight integrity to the hull 22 when fish transfer operations are not underway. The duct 25 leads into a hold or tank 30 of the ship 20. This hold 30 may be termed the fish entry tank. The hold 30 is provided with a duct 31 connected to a high-volume, low-head pump 32 for dewatering the hold 30 and therethrough to a discharge opening 33 through the hull 22 of the ship on the opposite side of the vessel from the duct 25. The flow of water generated by the pump 32 thus assists the passage of fish through the opening 24. The opening 24, being ducted by the duct 25, creates a venturi effect to increase the velocity of the flow, preferably to at least 5 knots $\times$ 6080/60$\times$60 = 8.4 feet per second through the duct 25.

Figure 11:
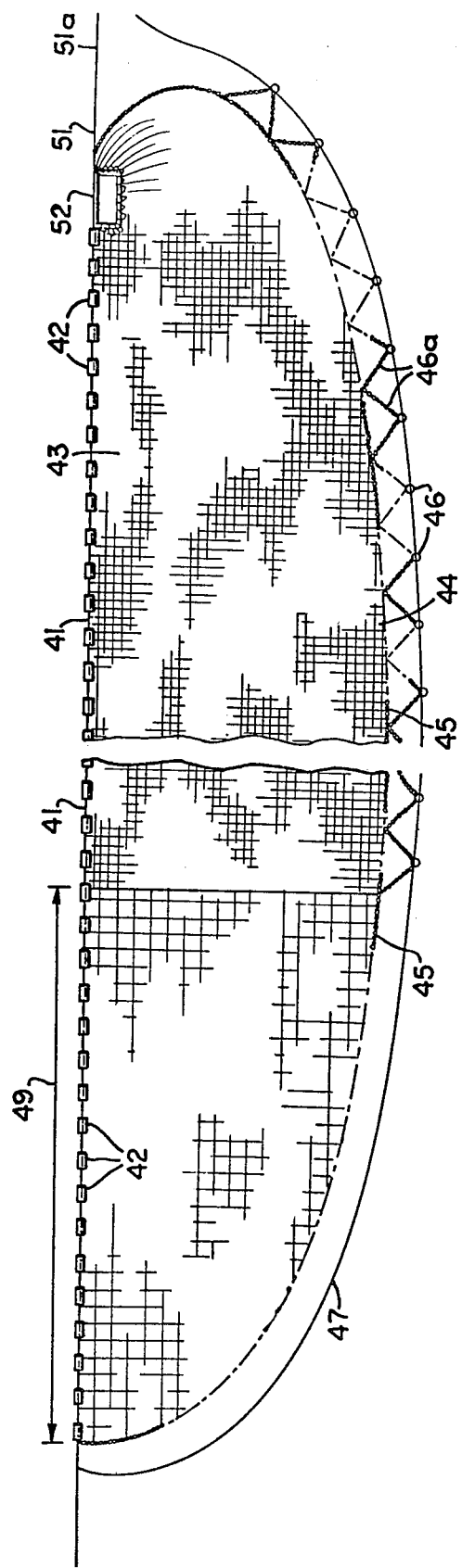
FIG. 11 is a view in elevation of a purse-seine net which may be used in the present invention.

Once the fish have entered through the duct 25 into the fish entry tank 30, they are in a controlled environment, in contrast to the open sea. The transfer of the fish out of the water may then be effected by a jet suction pump, or by fish ladders or elevators, or by brailing gear, or in some other manner. A screen 29 prevents fish from flowing out through the discharge opening 33, which has a jet nozzle 37.

As stated earlier, the provision of the large opening 24 in the vessel's side 23 has major effects on the trim and stability characteristics of the vessel 20. These effects— if not compensated—would combine to reduce the vessel's reserve buoyancy and her transverse and longitudinal metacentric heights and also would introduce a large heeling and trimming moment. In order to compensate for these effects and to maintain stability and seaworthiness, the present invention employs a unique stability-compensating system, which includes:

a. a compensating heel tank 34, so positioned on the opposite side 35 of the vessel 20 from the opening 24 as to offset heel or list effect when the entry tank 30 is flooded from the sea.

b. a compensating trim tank, so located in the vessel as to offset the trim effect when the fish entry tank 30 is flooded from the sea. This compensating trim tank may be the same tank 34, as shown in FIGS. 2 and 3, or may be a separate tank 36, as shown in FIG. 6. When a plurality of compensating tanks is employed, as in FIG. 6, their combined heel and trim moments (i.e., the weight of each tank liquid times the lever arm lengths for trim and heel, respectively) remains the same as for a single tank like the tank 34. A multiple tank system may (or may not) be more suitable for arrangements within the vessel, c. minimizing the free surface effect, which tends to reduce the vessel's metacentric height and, consequently, the vessel's stability, by designing the heel tank 34 and the trim tank 36 to have waterplanes with small moments of inertia or to be pressed up full when in use.

d. the high-volume, low-head pump 32 has conduits 38 and 39 to provide for rapid transfer of sea water to flood the heel tank 34 and the trim tank 36 quickly when the fish entry tank 30 is flooded, and e. shaping the hull 22 to accommodate the effects of the flooding, heeling, and trimming and to insure adequate limits of freeboard, stability and seaworthiness through all ranges of such operations.

To accommodate the weight and free surface effect of flooding the compensating tank water, especially when the vessel is near full load displacement, the hull form is designed with a high transverse moment of inertia waterplane at full range only. This may be accomplished by increasing the beam within the middle half length at the full draft displacement with a fixed blister arrangement shown in FIGS. 7 and 8. Thus, the hull 22 has blisters 66 and 67 located to be just above the normal full load waterline $W_1L_1$ and to be largely submerged in the operating mode at a waterline $W_2L_2$, when the fish entry tank 30 and the compensating tank 34 are full of water.

Thus, where:
GM is the metacentric height,
BM is the metacentric height above the center of buoyancy,
$L_T$ is the transverse moment of inertia of the water plane,
$\nabla$ is the volume of displacement,
L is the length of the vessel, and
B is the beam (width) of the vessel,
GM varies with BM and is proportional to $I_T/\nabla$
$I_T = f(LB^3)$
∴ $I_T$ is proportional to $B^3$.

Hence, a slight increase in beam width, supplied by the blisters 66 and 67 when the vessel sinks from $W_1L_1$ to $W_2L_2$, has a cubing effect in the increase of $I_T$.

Due to torsional loads on the hull (should these two tanks be of relatively large size), special structure is designed into hull girder strength to take such loads.

The volume rate of water Q discharge overboard to maintain a 5.0 knot flow velocity through the fish entry duct of $6^{ft} \times 2^{ft}$ dimension is approximately:

$Q = AV$
$= (6^{ft} \times 2^{ft}) \left( 5.0 \text{ knots} \times \dfrac{6080^{ft}}{60} \times 7.48 \text{ gal/ft}^3 \right)$ Q = 45,478 GPM
Pump Horsepower $HP = \dfrac{GPM \times Head}{3960 \times eff. \text{ pump}}$    Head = 5 ft.
eff. pump = 0.80
$= \dfrac{45{,}478 \times 5}{3960 \times .80} = 72$ The jet effect of this water discharged overboard has a resultant thrust against the vessel. Employing this thrust with a directional control nozzle, together with a bow thruster provides an efficient and highly effective maneuvering of the vessel during fish entry, either by lure or from net.

The transfer system includes the high-capacity low-head pump 32 (which may be electrically or hydraulically powered) taking suction from the fish entry tank 30 and discharging through the discharge opening on the opposite side 35 with the jet nozzle 37.

To fill the fish entry tank 30 and the compensating tanks 34 prior to landing fish, a sea valve 68 in the tank 30 may be opened. The transfer pump 32 then takes suction from the flooding tank 30 and transfers water to the compensating tank 34 (or 34 and 36) at a rate such that both tanks are filled at the same rate. When both tanks 30 and 34 are full, a side shell gate 69 and a sea valve 70 to the compensating tank 34 is closed. Next, the overload discharge valve 71 is opened. The system is now ready to draw fish into the fish entry tank 30 by actuating the transfer pump 32. To empty the tanks 30 and 34 (and 36) the reverse procedure is followed, i.e.: the side shell gate 69 is closed, the valve 70 is opened, the suction of the transfer pump 32 is used to discharge both tanks 30 and 34 simultaneously through the overload discharge valve 71, and then the valve 71 is closed. Check valves 73 and 74 are also provided.

When purse-seining is employed, a special type of purse-seine net 40 is preferably provided, with an upper edge 41, as shown in FIG. 11, having therealong a series of flotation means 42, such as corks or other buoyant objects, serving to keep this upper edge 41 of the net 40 afloat. Preferably, as shown in FIG. 11, a special net is used in which a major portion 43, approximately ⅔ of the net 40, is made from heavy nylon (or equivalent material) and is provided along its bottom edge 44 with a chain 45, incorporating a plurality of purse rings 46 attached to the chain 45 by a triangular array of connecting chains 46a, and a pursing rope 47, passing from one end 48 of the net 40 through these purse rings 46. The other, or minor, portion 49 of the net 40 is made from lighter nylon or other relatively lightweight material, and it does not have to be nearly so strong, nor is it provided with any pursing rings 46; however, both portions 43 and 49 are provided with sufficient chain 45 to pull the bottom edge 44 of the net 40 down into the water, so that the net 40 is maintained in a vertical position.

At the leading end 51 of the heavier net portion 43 is provided a frame or hoop 52 for fitting around the opening 24. A tow line 51a is provided at the end 51 for towing the net 40 during encirclement of a school of fish. The hoop 52 comprises a ring bar bent into the shape of the opening 24, which may be substantially rectangular, with its upper edge in line with or an extension of the cork line 42 and the upper edge of the net 41. The net lines are securely tied to the bottom and sides of the hoop 52, with one-third of the lines to the left tucked along the left side and half of the bottom of the hoop 52. The remaining two-thirds of the lines are tucked around and attached to the right side and other half of the bottom of the hoop 52.

The hull side 23 is provided with a pair of guides 53 and 54, which may comprise angle irons, down which the hoop 52 may be slid, and a bottom stop 55 is provided to limit the downward movement of the hoop 52 and to align the hoop 52 with the opening 24. A winch 56, cable 57, boom 59, and pulley system 58 support the frame 52 when it is being lowered into place or raised. In addition, a three-drum winch system 63 is provided for pulling in the purse rope 47 from each end and the tow line 51a.

Fishing, according to this invention, may proceed along the general lines already described, but some important differences may be introduced. Due to the lightness of the rear third of the net it becomes possible to lay this net 40 much more swiftly than has been done heretofore, particularly when using a mechanical drum system, including the drum 61 around which the net 40 is wound.

Figure 12:
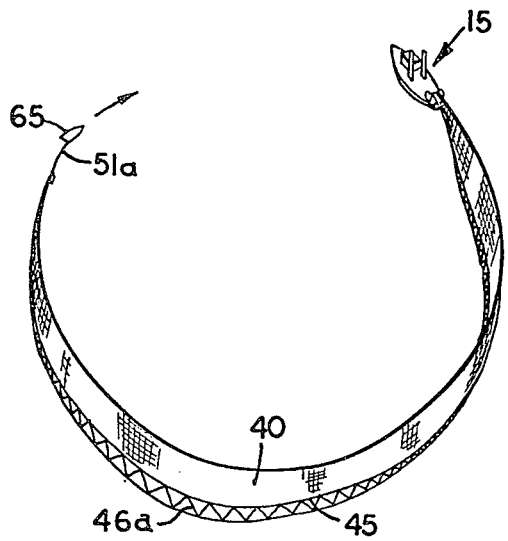
FIG. 12 is a somewhat diagrammatic view in perspective of a ship of this invention laying the purse-seine net. One end of the net is affixed to a skiff while the ship makes a big circle, coming back toward the skiff, which is also moving.
Figure 13:
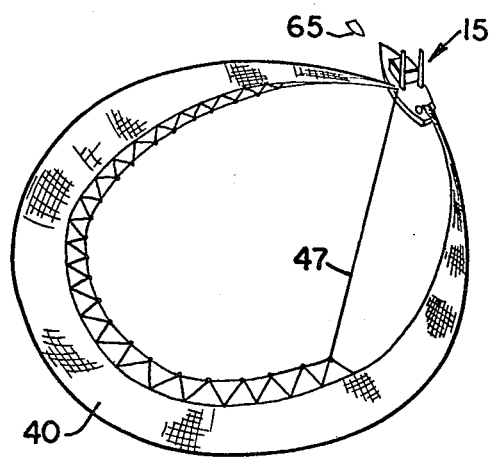
FIG. 13 is a view similar to FIG. 11 showing the ship having completed its circle and beginning to haul in the purse lines, thus pursing the net.

As shown in FIG. 12, a power skiff 65 holds one end 48 of the net 40 via the towline 51a during the net laying operation, while the ship 20, at good speed, makes a wide circle, approximately the same circumference as the length of the net 40. The flotation means 42 keep the upper edge 41 of the net 40 on or near the surface, while the chains 45 and 46a carry the lower edge of the net down into the water. As shown in FIG.

Figure 14:
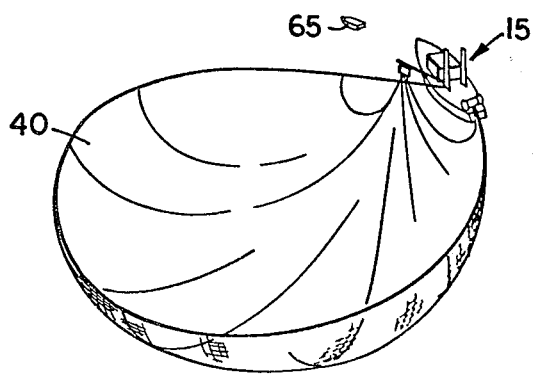
FIG. 14 is a view similar to FIG. 12, showing the stage in which the pursing has been completed and the purse opening brought to the opening through the ship's hull.
Figure 15:
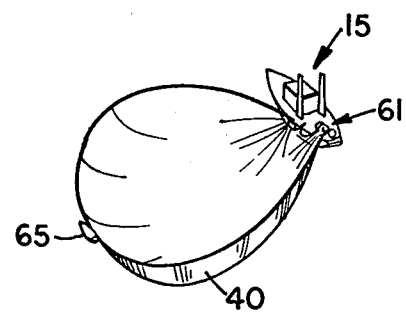
FIG. 15 is a similar view, showing a stage at which the net has been considerably shortened.

13, when the circle is completed, the pursing line 47 extends as a cord across a portion of the arc and goes directly to the first ring 46, rather than extending completely around the circumference of the net 40. It should be noted that the net 40 is always laid with the skiff 65 in position so that the school of fish will be swimming towards the leading heavy two-thirds of the net 40, whereas the trailing light one-third of the net 40, that is brought around will not come in contact with or be strained by the fish. The net 40 is then taken away from the skiff 65, and the skiff 65 prepares for later operations where it assists. Then (Fig. 14) the net 40 is pursed by pulling the purse line 47, thereby preventing the fish from escaping by diving below the net, upon completion of pursing, with all the rings 46 collected together, the rings 46 are hoisted on board the vessel 15 and placed on a ring bar in order, with the rings 46 nearest the hoop 52 on the bottom and the ones nearest the trailing edge 49 of the net 40 on top.

As the net 40 is wound on the drum 61, the fish separation operation may be withheld for awhile, pending a suitable concentration of fish in the water, or it may begin at any time where there is a sufficient concentration of fish to make it worthwhile and this may be very early indeed. When the hoop 52 is then lowered in place, the fish entry tank 30 is opened by opening the gate 26, and the tank 30 is flooded. Then the pump 32 is started and pumps out water, causing a suction, resulting in a flow of water into the duct 25. Simultaneously, the net 40 is being shortened, and continues to be shortened, giving the fish less and less space inside the net 40 and urging them to find a way out. The only way out is in through the opening 24, and this, of course, turns out to be a trap for them. They enter through the duct 25 and are confined there, and directed against an elevator or other such device. They are prevented from going back out the duct 25 by the velocity of the incoming sea water that is sucked in by the pump 32; the fish are prevented from going out through the pump 32. They then may be carried by the elevator or fish ladder out from this tank 30 and may be put aboard a suitable conveyor which carries them to various fish storage holds.

Further improved results can be obtained by using specially shaped compensating tanks. For example, the tank 34 shown in FIG. 9 is a conventional cubic tank with a ventilator 75. In FIG. 10 is a tank 34a wherein the upper portion 76 converges toward an upper wall 77 which is much smaller in area than the bottom wall 78.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

What is claimed is:

1. An oceanic fishing system, including in combination:
   a ship having an opening through its hull below waterline on the port side,
   a fish entry tank in said ship on the port side and connected to said opening by a conduit,
   closure means for said opening so that it can be shut or open as desired,
   compensating heel and trim tank means in said ship on the opposite side of said ship from said fish entry tank for offsetting the heel, list, and trim effects of entry of water into said hold compartment,
   means inside said fish entry tank for separating the fish from the water and removing the fish,
   first pumping means for drawing water into said fish entry tank through said opening, carrying fish therewith, and for returning the sea water to the sea, and
   second pumping means for transferring water from the sea rapidly into said heel and trim tank means quickly while said fish entry tank is being flooded.

2. The system of claim 1 wherein said opening is generally rectangular.

3. An oceanic fishing method employing a ship having a below-waterline opening into one side of its hold, comprising:
   concentrating fish around said ship opening,
   suctioning sea water and the fish in through said opening, while flooding compensating tank means on the other side of said hold,
   separating the fish from the sea water, and
   returning the excess sea water to the sea.

4. An oceanic fishing system, including in combination:
   a ship having an opening through its hull below waterline on the port side, leading into a holding compartment on said port side,
   closure means for said opening so that it can be shut or open as desired,
   compensating tank means in said ship on the starboard side located where the heeling and trimming effect of letting water through said opening into said holding compartment can be compensated by equal flooding,
   means inside said holding compartment adjacent said opening for separating the fish from the sea water,
   main pumping means for drawing sea water and the fish through said opening with said holding compartment,
   ballast pumping means for drawing sea water into said compensating tank at the same rate as that drawn into said holding compartment until both reach a desired flooding stage, and
   means for thereafter exhausting water from said holding compartment into the sea at the same rate at which sea water enters said opening.

5. The system of claim 4 wherein said opening is generally rectangular.

6. The system of claim 4 wherein said means inside the holding compartment comprises an elevating conveyor extending below and above water level and a screen adjacent said conveyor.

* * * * *